United States Patent Office 3,135,581
Patented June 2, 1964

3,135,581
PROCESS FOR THE PRODUCTION OF DIMANGANESE DECACARBONYL AND DIALKALI METAL MANGANESE CYCLOPENTADIENYL PENTACARBONYL AMINES
Leo Parts, Dayton, Ohio, assignor to Union Carbide Corporation, a corporation of New York
No Drawing. Filed Feb. 12, 1962, Ser. No. 172,817
23 Claims. (Cl. 23—14)

This invention relates to a process for the production of dimanganese decacarbonyl, a known anti-knock agent for gasoline. This invention further relates to novel organometallic compounds which are useful as chemical intermediates and to processes for their production.

The process of this invention comprises the conversion of a cyclopentadienyl manganese tricarbonyl compound to dimanganese decacarbonyl as illustrated by the following schematic equations:

(I)   $2RMn(CO)_3 + 4M + 6R^1$
    $\rightarrow M_2Mn_2R(CO)_5(R^1)_6 + RM + M(CO)$ (Ia)  $M_2Mn_2R(CO)_5(R^1)_6 \xrightarrow{\Delta} M_2Mn_2R(CO)_5(R^1)_3 + 3R^1$ (II)  $2M_2Mn_2R(CO)_5(R^1)_x + 10CO \xrightarrow{\Delta} 4MMn(CO)_5 + R-R + 2X(R^1)$ (III) $M\,Mn(CO)_5 + H^+ \rightarrow Mn(CO)_5H + M^+$ (IV)  $2Mn(CO)_5H + [O] \rightarrow Mn_2(CO)_{10} + H_2O$ wherein R is a cyclopentadienyl moiety as hereinafter defined; M is a group I alkali metal; $R^1$ is a heterocyclic tertiary amine moiety as hereinafter defined; and $x$ is an integer having a value of 3 or 6. Thus, the process of this invention comprises reacting a cyclopentadienyl manganese tricarbonyl compound with an alkali metal and a heterocyclic tertiary amine to form a dialkali metal manganese cyclopentadienyl pentacarbonyl hexaamine compound, which can be converted to a dialkali metal manganese cyclopentadienyl pentacarbonyl triamine compound by heating; reacting the hexa-amine compound or the triamine compound with carbon monoxide to produce an alkali metal manganese pentacarbonyl compound; acidifying the alkali metal manganese pentacarbonyl compound to form manganese pentacarbonyl hydride; and oxidizing the manganese pentacarbonyl hydride to form dimanganese decarcarbonyl.

The first step of the process of this invention comprises reacting a cyclopentadienyl manganese tricarbonyl compound with an alkali metal and a heterocyclic tertiary amine to form a dimanganese dialkali metal cyclopentadienyl pentacarbonyl hexa-amine compound, as illustrated by Equation I, above.

The cyclopentadienyl manganese tricarbonyl compound employed in the process of this invention is represented by the general formula $RMn(CO)_3$ wherein R is a cyclopentadienyl moiety represented by the formula

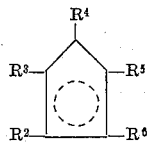

wherein each $R^2$, $R^3$, $R^4$, $R^5$, and $R^6$, when taken individually, is a hydrogen atom or an alkyl radical having from 1 to about 5 carbon atoms, such as methyl, ethyl, propyl, butyl, pentyl, and the like. The dotted ring in the formula for the cyclopentadienyl moiety indicates that the moiety is bonded to the manganese atom by pi bonding. The $C_5$ ring contains five carbon atoms that are uniformly covalently bonded to each other, with an additional electron of each carbon atom forming a covalent bond with said $R^2$, $R^3$, $R^4$, $R^5$, and $R^6$. The remaining five electrons form a cloud of pi electrons which circulates above and below the plane of the ring and effectuates the bonding of the cyclopentadienyl moiety to the manganese atom. As examples of cyclopentadienyl manganese tricarbonyl compounds that can be employed in the process of this invention one can mention cyclopentadienyl manganese tricarbonyl, methylcyclopentadienyl manganese tricarbonyl, the dimethylcyclopentadienyl manganese tricarbonyls, the trimethylcyclopentadienyl manganese tricarbonyls, tetramethylcyclopentadienyl manganese tricarbonyl, pentamethylcyclopentadienyl manganese tricarbonyl, the ethyl-substituted cyclopentadienyl manganese tricarbonyls, the propyl-substituted cyclopentadienyl manganese tricarbonyls, and the like. Preferred are those compounds having from 5 to about 10 carbon atoms in the cyclopentadienyl moiety. Cyclopentadienyl manganese tricarbonyl is particularly preferred.

The alkali metal employed in the process of this invention can be any metal selected from group I of the periodic table, such as lithium, sodium, potassium, rubidium, and cesium, with lithium and sodium preferred.

The heterocyclic tertiary amine employed in the first step of the process of this invention is represented by the formula:

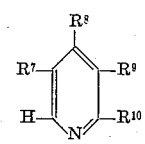

wherein each $R^7$, $R^8$, $R^9$, and $R^{10}$, when taken alone, is a hydrogen atom or an alkyl radical having from 1 to about 5 carbon atoms, such as methyl, ethyl, propyl, butyl, pentyl, and the like. As examples of heterocyclic tertiary amines that can be employed in the first step of the process of this invention one can mention pyridine, 2-methylpyridine (2-picoline), 3-methylpyridine (3-picoline), 4-methylpyridine (4-picoline), 2,3-dimethylpyridine, 2,4-dimethylpyridine, 2,5-dimethylpyridine, 3,4-dimethylpyridine, 3,5-dimethylpyridine, 2,3,4-trimethylpyridine, 2,3,5-trimethylpyridine, 2,4,5-trimethylpyridine, 2,3,4,5-tetramethylpyridine, the ethylpyridines, the diethylpyridines, the triethylpyridines, 2,3,4,5-tetraethylpyridine, the various propyl-substituted pyridines, and the like. Preferred heterocyclic tertiary amines are those having from about 5 to about 10 carbon atoms. Pyridine and 4-methylpyridine (4-picoline) are particularly preferred.

The molar ratio of the cyclopentadienyl manganese tricarbonyl compound to alkali metal in the charge to the first step of the process of this invention can vary from about 0.5:1 or less to about 2:1 or more. It is preferred, however, that sufficient cyclopentadienyl manganese tricarbonyl compound be utilized to convert all of the alkali metal charged to the reaction mixture to the alkali metal cyclopentadienyl manganese tertiary amine product, for if an excess of the alkali metal is employed the product will be contaminated with an alkali metal complex of the tertiary amine. Accordingly, a mole ratio of cyclopentadienyl manganese tricarbonyl compound to alkali metal of at least 0.5:1 is preferably employed.

The mole ratio of heterocyclic tertiary amine to alkali metal in the charge can vary from about 2:1 or less to about 5:1 or more. It is preferred, however, that an excess of the tertiary amine be employed to serve as a reaction solvent. Accordingly, a mole ratio of tertiary amine to alkali metal of at least 3:1 is preferably employed.

The temperature at which the first step of this invention is conducted can vary from about −20° C. or lower to about 50° C. or higher. It is preferred, however, to employ reaction temperatures of about 25° C. Where the hexa-amine is desired as a product, reaction temperatures of less than about 50° C. are employed, for higher temperatures cause decomposition of the hexa-amine to the triamine as shown by Equation Ia above.

The first step of the process of this invention, as shown by Equation I, is preferably conducted in the absence of air under an inert atmosphere, such as an argon, helium, or nitrogen atmosphere. Nitrogen cannot be employed, however, when lithium is employed as the alkali metal.

The dialkali metal dimanganese cyclopentadienyl pentacarbonyl hexa-amines produced by this step are solids which can be isolated from the reaction mixture, if desired, by known solid-liquid separation procedures, such as by filtration, centrifugation, distillation, and the like. These compounds are novel compounds and can be represented by the formula:

$$M_2Mn_2R(CO)_5(R^1)_6$$

wherein M, R, and $R^1$ are as defined above. As examples of the hexa-amine compounds of this invention, one can mention disodium dimanganese cyclopentadienyl pentacarbonyl hexapyridine, disodium dimanganese cyclopentadienyl pentacarbonyl hexa-2-methylpyridine, disodium dimanganese cyclopentadienyl pentacarbonyl hexa-3-methylpyridine, disodium dimanganese cyclopentadientyl pentacarbonyl hexa-4-methylpyridine, disodium dimanganese cyclopentadienyl pentacarbonyl hexa-2-ethylpyridine, disodium dimanganese methylcyclopentadienyl pentacarbonyl hexapyridine, disodium dimanganese ethylcyclopentadienyl pentacarbonyl hexapyridine, dilithium dimanganese cyclopentadienyl pentacarbonyl hexapyridine, dipotassium dimanganese cyclopentadienyl pentacarbonyl hexapyridine, and the like.

The hexa-amine produced by step I, when heated, reacts to form a dialkali metal dimanganese cyclopentadienyl pentacarbonyl triamine compound, as is illustrated by Equation Ia above.

The reaction occurs at a temperature of at least 50° C. The maximum temperature is set by the temperature at which the triamine product decomposes. For example when producing $Na_2Mn_2(C_5H_5)(CO)_5(C_5H_5)_3$ from $Na_2Mn_2(C_5H_5)(CO)_5(C_5H_5N)_6$, temperatures of less than about 130° C. are required.

The reaction can be conducted with or without the use of solvents. When solvents are used, an excess of the heterocyclic tertiary amine that forms the amine moiety of the hexamine compound is preferably employed. This step is preferably conducted under an inert atmosphere, such as an argon or nitrogen atmosphere. The triamine compound can be recovered from the reaction medium, if desired, by known solid-liquid separation processes, such as by filtration, centrifugation, and the like.

The triamine compounds are novel compounds and can be represented by the formula:

$$M_2Mn_2R(CO)_5(R^1)_3$$

wherein M, R, and $R^1$ are defined above. As examples of such compounds, one can mention disodium dimanganese cyclopentadienyl pentacarbonyl tripyridine, disodium dimanganese cyclopentadienyl pentacarbonyl tri-2-methylpyridine, disodium dimanganese cyclopentadienyl pentacarbonyl tri-3-methylpyridine, disodium dimanganese cyclopentadienyl pentacarbonyl tri-4-methylpyridine, disodium dimanganese cyclopentadienyl pentacarbonyl tri-2-ethylpyridine, disodium dimanganese methylcyclopentadienyl pentacarbonyl tripyridine, disodium dimanganese ethylcyclopentadienyl pentacarbonyl tripyridine, dilithium dimanganese cyclopentadienyl pentacarbonyl tripyridine, dipotassium dimanganese cyclopentadienyl pentacarbonyl tripyridine, and the like.

The hexa-amine and triamine compounds react with carbon monoxide to produce an alkali metal manganese pentacarbonyl compound as is illustrated by Equation II above.

In general, this second step in the production of dimanganese decacarbonyl is carried out by contacting a solution of the hexa-amine or triamine compound in the heterocyclic tertiary amine forming the amine moiety of said compound with carbon monoxide by methods known to those skilled in the art.

The reaction is conducted in a carbon monoxide atmosphere. The pressure can range from atmospheric pressure to superatmospheric pressure. Preferred carbon monoxide pressures are from about 2500 p.s.i. to about 4000 p.s.i. The reaction temperature can be from 15° C. to about 300° C., but it is preferably from about 75° C. to about 130° C.

The alkali metal manganese pentacarbonyl can be isolated from the reaction mixture by vacuum distillation at about 25° C. or above to remove the reaction solvent.

The third step in the process of this invention comprises acidifying the alkali metal manganese pentacarbonyl, according to methods known in the art, to produce manganese pentacarbonyl hydride. This reaction is illustrated by Equation III above. Acids which can be employed include organic and mineral acids, provided the acids are not oxidizing agents. Accordingly, nitric acid cannot be employed. Examples of acids which can be employed are acetic acid and halogen-substituted acetic acids such as trifluoroacetic acid, sulfuric acid, hydrochloric acid, phosphoric acid and the like. Preferred acids are sulfuric acid and hydrochloric acid.

The acidification can be conducted at a temperature of from about −25° C. or less to about 25° C. or more. It is preferred, however, that temperatures of about 0° C. be employed.

The manganese pentacarbonyl hydride separates from the aqueous acidic mixture resulting from the acidification as an oily liquid which floats on top of the aqueous acidic layer and may be isolated by known separation methods, if desired.

The final step of the process of this invention comprises oxidizing the manganese pentacarbonyl hydride to dimanganese decacarbonyl, as is illustrated in Equation IV, above. The preferred oxidizing agents are air or oxygen although other agents, such as peroxides, can be employed as long as the hydride or the decacarbonyl is not destroyed thereby.

Dimanganese decacarbonyl can be recovered from the reaction mixture by known solid-liquid separation procedures, such as by centrifugation, filtration, and the like. The product can be purified by steam distillation, after which the distillate is mixed with a solvent such as toluene, whereby dimanganese decacarbonyl precipitates out, is filtered off, and dried. The solvent can be distilled to recover cyclopentadienyl manganese tricarbonyl as a residue which may be recycled to the process of this invention.

The process of this invention can be conducted with or without separation of the intermediate products, as may be desired. Such separations are not necessary, however, and they are preferably not employed when dimanganese decacarbonyl is the desired final product.

A preferred embodiment of the process of this invention comprises dissolving cyclopentadienyl manganese tricarbonyl in an excess of pyridine. Metallic sodium is then added to the resulting solution under an argon atmosphere. The reaction mixture is stirred at 25–30° C. for about 1 day to about 2 days. The resulting reaction mixture is then reacted with carbon monoxide at a pressure of from about 2500 p.s.i. to about 3000 p.s.i. at a temperature of from 75° C. to about 130° C. for from about 1 hour to about 3 hours, cooled to about 0° C., and acidified with sulfuric acid, after which air at atmospheric pressure is bubbled through the reaction mixture for from about 10 minutes to about 1 hour at about 20–30° C. Dimanganese decacarbonyl is recovered from the reaction mixture by filtration and is purified by steam distillation and recrystallization from toluene.

The following examples are illustrative:

Example I

Metallic sodium weighing 6.9 grams (0.3 mole) was added in one piece to a solution containing 33.7 grams (0.165 mole) of cyclopentadienyl manganese tricarbonyl in 250 milliliters of pyridine. The resulting mixture was allowed to stand at room temperature with occasional stirring in an argon atmosphere for 2 days. No gas evolution was observed. The red-colored, crystalline solid disodium dimanganese cyclopentadienyl pentacarbonyl hexapyridine that had formed was filtered from the reaction mixture under an argon atmosphere. The solid, after washing with pyridine and drying in a vacuum desiccator, weighed 44.1 grams, representing a 70.3% yield, based on sodium. *Analysis.*—Calculated for $Na_2Mn_2(C_5H_5)(CO)_5(C_5H_5N)_6$: C, 57.5%; H, 4.2%; Mn, 13.2%; Na, 5.5%. Found: C, 57.9%; H, 4.3%; Mn, 13.6%; Na, 6.1%.

The product is slightly soluble in pyridine and is insoluble in benzene and diethyl ether. Exposed to air, it ignites spontaneously.

Example II

Lithium ribbon weighing 2.08 grams (0.30 mole) was added to a solution containing 33.7 grams (0.165 mole) of cyclopentadienyl manganese tricarbonyl in 250 milliliters of pyridine. The resulting reaction mixture was allowed to stand at room temperature under an argon atmosphere for 2 days. The crystalline, dark red-colored solid that formed was filtered from the reaction mixture and washed with pyridine. After drying in a vacuum desiccator, the product, dilithium dimanganese cyclopentadienyl pentacarbonyl hexapyridine, weighed 26.1 grams, which corresponds to a yield of 44.0%, based upon lithium.

Example III

Metallic sodium weighing 6.9 grams (0.3 mole) was added to a solution of 33.7 grams (0.165 mole) of cyclopentadienyl manganese tricarbonyl in 250 milliliters of 4-picoline. The resulting reaction mixture was allowed to stand under an argon atmosphere for 2 days at room temperature. The disodium dimanganese cyclopentadienyl pentacarbonyl hexa-4-picoline that had formed, after filtering from the reaction mixture, washing with 4-picoline, and drying in a vacuum desiccator, weighed 41.7 grams, representing a 60.4% yield, based upon sodium.

Example IV

A charge containing 92.8 grams (0.111 mole) of $Na_2Mn_2(C_5H_5)(CO)_5(C_5H_5N)_6$ immersed in 450 milliliters of dry pyridine was stirred by means of a magnetic stirrer under an argon atmosphere. The reaction mixture was heated to a temperature of about 110–120° C., at which temperature the red-colored starting material was converted to an orange-brown colored voluminous solid. The reaction mixture was maintained at 110–120° C. for 55 minutes, after which time the orange-brown colored solid was completely converted to a crystalline solid that was slightly lighter red in color than the starting material. No carbon monoxide evolution was observed. The product, disodium dimanganese cyclopentadienyl pentacarbonyl tripyridine, after filtration from the reaction mixture and drying, weighed 60.6 grams (0.101 mole). An additional 3 grams of the product was obtained as a residue by vacuum distillation of the solvent from the filtrate. *Analysis.*—Calculated for

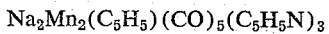
$Na_2Mn_2(C_5H_5)(CO)_5(C_5H_5N)_3$

C, 50.2%; Mn, 18.4%; Na, 7.7%. Found: C, 50.7%; Mn, 18.7%; Na, 6.8%.

Example V

A charge containing 55.7 grams (0.0666 mole) of $Na_2Mn_2(C_5H_5)(CO)_5(C_5H_5N)_6$ and 150 milliliters of pyridine was placed in a 300 milliliter stainless steel autoclave containing 10 stainless steel balls. The autoclave was sealed and carbon monoxide was introduced at a pressure of 3,500 p.s.i.g. The autoclave was then heated while agitating the reaction mixture by rocking. Carbon monoxide was absorbed at a temperature of from 90° C. to 133° C. over a period of 16 minutes. The reaction mixture was then cooled and pyridine was removed by vacuum distillation. The remaining residue was extracted with cyclohexane to recover cyclopentadienyl manganese tricarbonyl. The raffinate was acidified with ice-cold aqueous hydrochloric acid. Two layers formed, one of which was an oily layer which floated on top of a second aqueous layer. The oily layer, manganese pentacarbonyl hydride, $Mn(CO)_5H$, was separated from the aqueous layer and was air oxidized to dimanganese decacarbonyl by shaking in an aerated flask. The dimanganese decacarbonyl was then separated from the reaction mixture by filtration and purified by steam distillation. The steam distillate was mixed with toluene whereupon dimanganese decacarbonyl precipitated. After filtration from the toluene and drying, the dimanganese decacarbonyl that was recovered weighed 2.02 grams (0.0052 mole). The toluene was evaporated from the filtrate to leave a residue containing 11.2 grams (0.055 mole) of $C_5H_5Mn(CO)_3$. Dimanganese decacarbonyl and cyclopentadienyl manganese tricarbonyl were identified by their infrared spectra.

Example VI

A charge containing 37.1 grams of

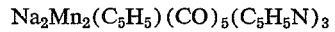
$Na_2Mn_2(C_5H_5)(CO)_5(C_5H_5N)_3$ and 150 milliliters of pyridine was placed in a 300-milliliter stainless steel autoclave containing 10 stainless steel balls. The autoclave was sealed and carbon monoxide at a pressure of 3,050 p.s.i.g. was introduced. The autoclave was heated at 120° C. for 3 hours while agitating the reaction mixture by rocking. The resulting mixture was vacuum distilled to remove pyridine. The remaining material was acidified with ice-cold, aqueous hydrochloric acid. The manganese pentacarbonyl hydride that formed was air oxidized to dimanganese decacarbonyl. The dimanganese decacarbonyl was filtered from the reaction mixture and purified by steam distillation. The dimanganese decacarbonyl, after recrystallization from toluene, weighed 3.0 grams (0.0077 mole). Distillation of toluene from the filtrate yielded 14.3 grams of cyclopentadienyl manganese tricarbonyl. The dimanganese decacarbonyl and the cyclopentadienyl manganese pentacarbonyl were identified by their infrared spectra and by elemental analysis of dimanganese decacarbonyl. The analysis of the dimanganese decacarbonyl produced was as follows: C, 30.6%; Mn, 27.8%. Calculated for $Mn_2(CO)_{10}$: C, 30.8%; Mn, 28.2%.

Example VII

A charge containing 30.6 grams (0.15 mole) of cyclopentadienyl manganese tricarbonyl and 150 milliliters of pyridine was added to a 300-milliliter autoclave containing 10 stainless steel balls. Sodium, weighing 7.59 grams (0.33 mole), was fastened to the inside of the top of the autoclave to prevent contact with the other reactants prior to pressurizing the autoclave with carbon monoxide and rocking. The autoclave was sealed and carbon monoxide at a pressure of 3,500 p.s.i.g. was introduced. The autoclave then was heated with rocking to a temperature of from 100° C. to 126° C., over which temperature range the carbon monoxide was absorbed. The resulting reaction mixture was vacuum distilled to remove pyridine. The remaining material was acidified with ice-cold, aqueous hydrochloric acid. The manganese pentacarbonyl hydride that formed was air-oxidized to dimanganese decacarbonyl. The dimanganese decacarbonyl was filtered from the reaction mixture and was purified by steam distillation. After recrystallization from toluene, the dimanganese decacarbonyl weighed 1.35 grams (0.0035 mole). Distillation of the toluene from the filtrate after recrystallization yielded 11.1 grams (0.054 mole) of cyclopentadienyl manganese tricarbonyl. The dimanganese decacarbonyl and the cyclopentadienyl manganese tricarbonyl were identified by their infrared spectra.

What is claimed is:

1. The process for producing a dialkali metal dimanganese cyclopentadienyl pentacarbonyl hexa-amine of the formula:

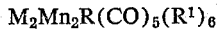

wherein M is an alkali metal atom; R is a cyclopentadienyl moiety having from 5 to 10 carbon atoms of the formula:

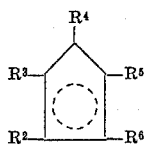

wherein each $R^2$, $R^3$, $R^4$, $R^5$, and $R^6$, when taken alone, is a member selected from the group consisting of a hydrogen atom and an alkyl radical, and $R^1$ is a heterocyclic tertiary amine moiety having from 5 to 10 carbon atoms of the formula:

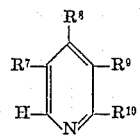

wherein each $R^7$, $R^8$, $R^9$, and $R^{10}$ is a member selected from the group consisting of a hydrogen atom and an alkyl radical, which comprises reacting a cyclopentadienyl manganese tricarbonyl compound of the formula:

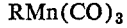

wherein R is as previously defined, with an alkali metal and a heterocyclic tertiary amine having from 5 to 10 carbon atoms of the formula:

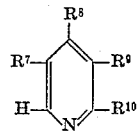

wherein $R^7$, $R^8$, $R^9$, and $R^{10}$ are as previously defined.

2. The process as claimed in claim 1 wherein said cyclopentadienyl managnese tricarbonyl compound is cyclopentadienyl manganese tricarbonyl.

3. The process as claimed in claim 1 wherein said heterocyclic tertiary amine is pyridine.

4. The process as claimed in claim 1 wherein said heterocyclic tertiary amine is 4-picoline.

5. The process as claimed in claim 1 wherein said alkali metal is sodium.

6. The process as claimed in claim 1 wherein said alkali metal is lithium.

7. A dialkali metal dimanganese cyclopentadienyl pentacarbonyl hexa-amine of the formula:

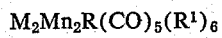

wherein M is an alkali metal atom; R is a cyclopentadienyl moiety having from 5 to 10 carbon atoms of the formula:

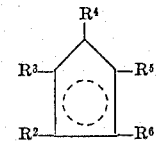

wherein each $R^2$, $R^3$, $R^4$, $R^5$, and $R^6$, when taken alone, in a member selected from the group consisting of a hydrogen atom and an alkyl radical, and $R^1$ is a heterocyclic tertiary amine moiety having from 5 to 10 carbon atoms of the formula:

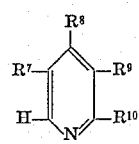

wherein each $R^7$, $R^8$, $R^9$, and $R^{10}$ is a member selected from the group consisting of a hydrogen atom and an alkyl radical.

8. Disodium dimanganese cyclopentadienyl pentacarbonyl hexapyridine.

9. Dilithium dimanganese cyclopentadienyl pentacarbonyl hexapyridine.

10. Disodium dimanganese cyclopentadienyl pentacarbonyl hexa-4-picoline.

11. The process for producing a dialkali metal dimanganese cyclopentadienyl pentacarbonyl triamine of the formula:

wherein M is an alkali metal atom; R is a cyclopentadienyl moiety having from 5 to 10 carbon atoms of the formula:

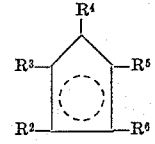

wherein each $R^2$, $R^3$, $R^4$, $R^5$, and $R^6$, when taken alone, is a member selected from the group consisting of a hydrogen atom and an alkyl radical, and $R^1$ is a heterocyclic tertiary amine moiety having from 5 to 10 carbon atoms of the formula:

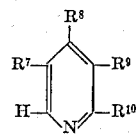

wherein each $R^7$, $R^8$, $R^9$, and $R^{10}$ is a member selected from the group consisting of a hydrogen atom and an alkyl radical, which comprises reacting at a temperature of at least 50° C. a dialkali metal dimanganese cyclopentadienyl pentacarbonyl hexa-amine compound of the formula:

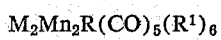

wherein M, R and $R^1$ are as previously defined.

12. The process as claimed in claim 11 wherein said dialkali metal dimanganese cyclopentadienyl pentacarbonyl hexa-amine is disodium dimanganese cyclopentadienyl hexapyridine.

13. A dialkali metal dimanganese cyclopentadienyl pentacarbonyl triamine of the formula:

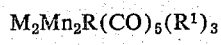

wherein M is an alkali metal; R is a cyclopentadienyl moiety having from 5 to 10 carbon atoms of the formula:

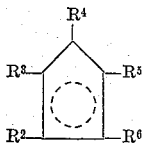

wherein each $R^2$, $R^3$, $R^4$, $R^5$, and $R^6$, when taken alone, is a member selected from the group consisting of a hydrogen atom and an alkyl radical; and $R^1$ is a heterocyclic tertiary amine moiety having from 5 to 10 carbon atoms of the formula:

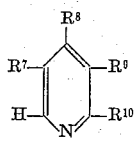

wherein each $R^7$, $R^8$, $R^9$, and $R^{10}$ is a member selected from the group consisting of a hydrogen atom and an alkyl radical.

14. Disodium dimanganese cyclopentadienyl pentacarbonyl tripyridine.

15. The process for producing an alkali metal manganese pentacarbonyl represented by the formula:

$$MMn(CO)_5$$

wherein M is an alkali metal atom, which comprises reacting a dialkali metal dimanganese cyclopentadienyl pentacarbonyl amine of the formula:

$$M_2Mn_2R(CO)_5(R^1)_x$$

wherein M is an alkali metal atom; X is an integer of the group consisting of 3 and 6; R is a cyclopentadienyl moiety having from 5 to 10 carbon atoms of the formula:

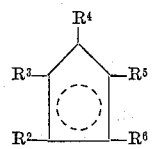

wherein each $R^2$, $R^3$, $R^4$, $R^5$, and $R^6$, when taken alone, is a member selected from the group consisting of a hydrogen atom and an alkyl radical; and $R^1$ is a heterocyclic tertiary amine moiety having from 5 to 10 carbon atoms of the formula:

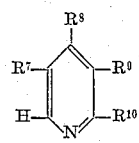

wherein each $R^7$, $R^8$, $R^9$, and $R^{10}$ is a member selected from the group consisting of a hydrogen atom and an alkyl radical with carbon monoxide at a pressure greater than atmospheric pressure.

16. The process as claimed in claim 15 wherein said dialkali metal dimanganese cyclopentadienyl pentacarbonyl amine compound is disodium dimanganese cyclopentadienyl pentacarbonyl hexapyridine.

17. The process as claimed in claim 15 wherein said dialkali metal dimanganese cyclopentadienyl pentacarbonyl amine compound is disodium dimanganese cyclopentadienyl pentacarbonyl tripyridine.

18. The process for producing dimanganese decacarbonyl which comprises reacting a cyclopentadienyl manganese tricarbonyl compound represented by the formula:

$$RMn(CO)_3$$

wherein R is a cyclopentadienyl moiety having from 5 to 10 carbon atoms of the formula:

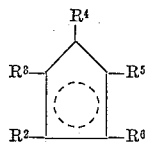

wherein each $R^2$, $R^3$, $R^4$, $R^5$, and $R^6$, when taken alone, is a member selected from the group consisting of a hydrogen atom and an alkyl radical, with an alkali metal and a heterocyclic tertiary amine having from 5 to 10 carbon atoms of the formula:

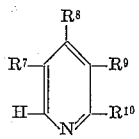

wherein each $R^7$, $R^8$, $R^9$, and $R^{10}$ is a member selected from the group consisting of a hydrogen atom and an alkyl radical, contacting the resulting reaction mixture with carbon monoxide at a pressure greater than atmospheric, acidifying the resultant reaction mixture, and thereafter oxidizing the acidified reaction mixture to form dimanganese decacarbonyl.

19. The process as claimed in claim 18 wherein said alkali metal is sodium.

20. The process as claimed in claim 18 wherein said alkali metal is lithium.

21. The process as claimed in claim 18 wherein said cyclopentadienyl manganese tricarbonyl compound is cyclopentadienyl manganese tricarbonyl.

22. The process as claimed in claim 18 wherein said heterocyclic tertiary amine is pyridine.

23. The process as claimed in claim 18 wherein said heterocyclic tertiary amine is 4-picoline.

No references cited.